United States Patent
Larkin et al.

(10) Patent No.: US 9,280,844 B2
(45) Date of Patent: Mar. 8, 2016

(54) ANIMATION

(71) Applicants: Andrew Larkin, Philadelphia, PA (US); Maurice Gaston, Philadelphia, PA (US)

(72) Inventors: Andrew Larkin, Philadelphia, PA (US); Maurice Gaston, Philadelphia, PA (US)

(73) Assignee: Comcast Cable Communications, LLC, Philadephia, PA (US)

(*) Notice: Subject to any disclaimer, the term of this patent is extended or adjusted under 35 U.S.C. 154(b) by 208 days.

(21) Appl. No.: 13/796,013

(22) Filed: Mar. 12, 2013

(65) Prior Publication Data
US 2014/0267303 A1    Sep. 18, 2014

(51) Int. Cl.
*G06T 15/00*    (2011.01)
*G06T 13/80*    (2011.01)

(52) U.S. Cl.
CPC ............... *G06T 13/80* (2013.01); *G06T 15/00* (2013.01)

(58) Field of Classification Search
CPC ............................... G06T 13/80; G06T 15/00
USPC .......................................... 345/473, 474, 475
See application file for complete search history.

(56) References Cited

U.S. PATENT DOCUMENTS

| | | | |
|---|---|---|---|
| 6,600,491 B1* | 7/2003 | Szeliski et al. | 345/473 |
| 7,327,368 B2* | 2/2008 | Le Tuan | 345/473 |
| 7,423,649 B2* | 9/2008 | Henocq et al. | 345/473 |
| 7,636,093 B1* | 12/2009 | Kuwamoto | 345/474 |
| 7,690,011 B2* | 3/2010 | Lienhart et al. | 725/25 |
| 7,928,985 B2* | 4/2011 | Goldfarb | 345/473 |
| 7,936,927 B2* | 5/2011 | Grabli et al. | 382/202 |
| 8,134,558 B1* | 3/2012 | Mayhew | 345/473 |
| 8,400,513 B2* | 3/2013 | Ishii | 348/169 |
| 8,411,967 B2* | 4/2013 | Grabli et al. | 382/202 |
| 8,451,277 B2* | 5/2013 | Whited et al. | 345/473 |
| 8,902,235 B2* | 12/2014 | Chiculiță | 345/473 |

* cited by examiner

*Primary Examiner* — Phu K Nguyen
(74) *Attorney, Agent, or Firm* — Banner & Witcoff, Ltd.

(57) ABSTRACT

An animation system may allow users to create animations by accessing a matrix of possible animation images, in which images may be arranged to be adjacent to one another based on similarity, and allowing a user to select one or more images. The system may then determine an animation path through the matrix or group of images. A display system can retrieve and display images along the path to generate an animation.

20 Claims, 12 Drawing Sheets

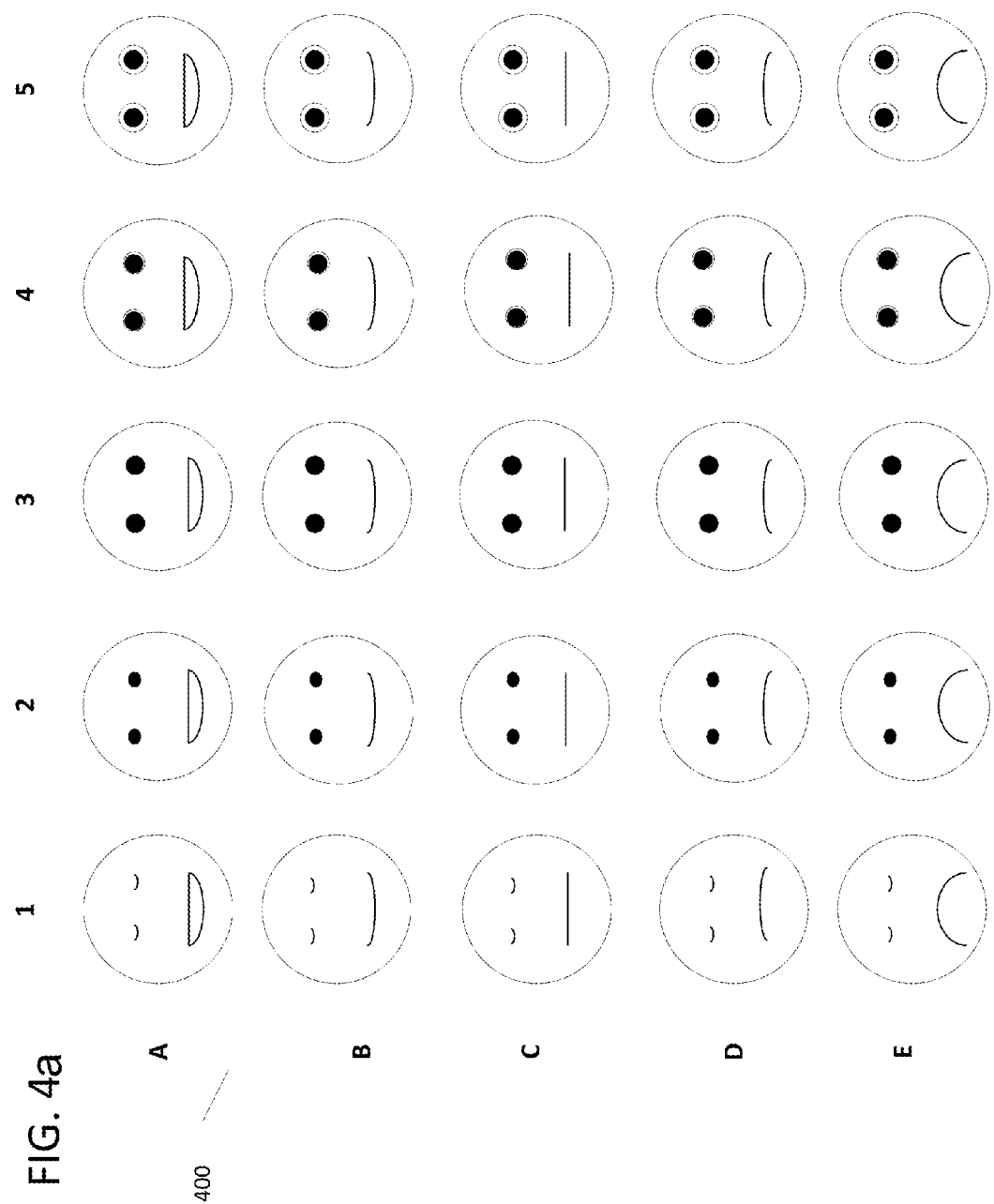

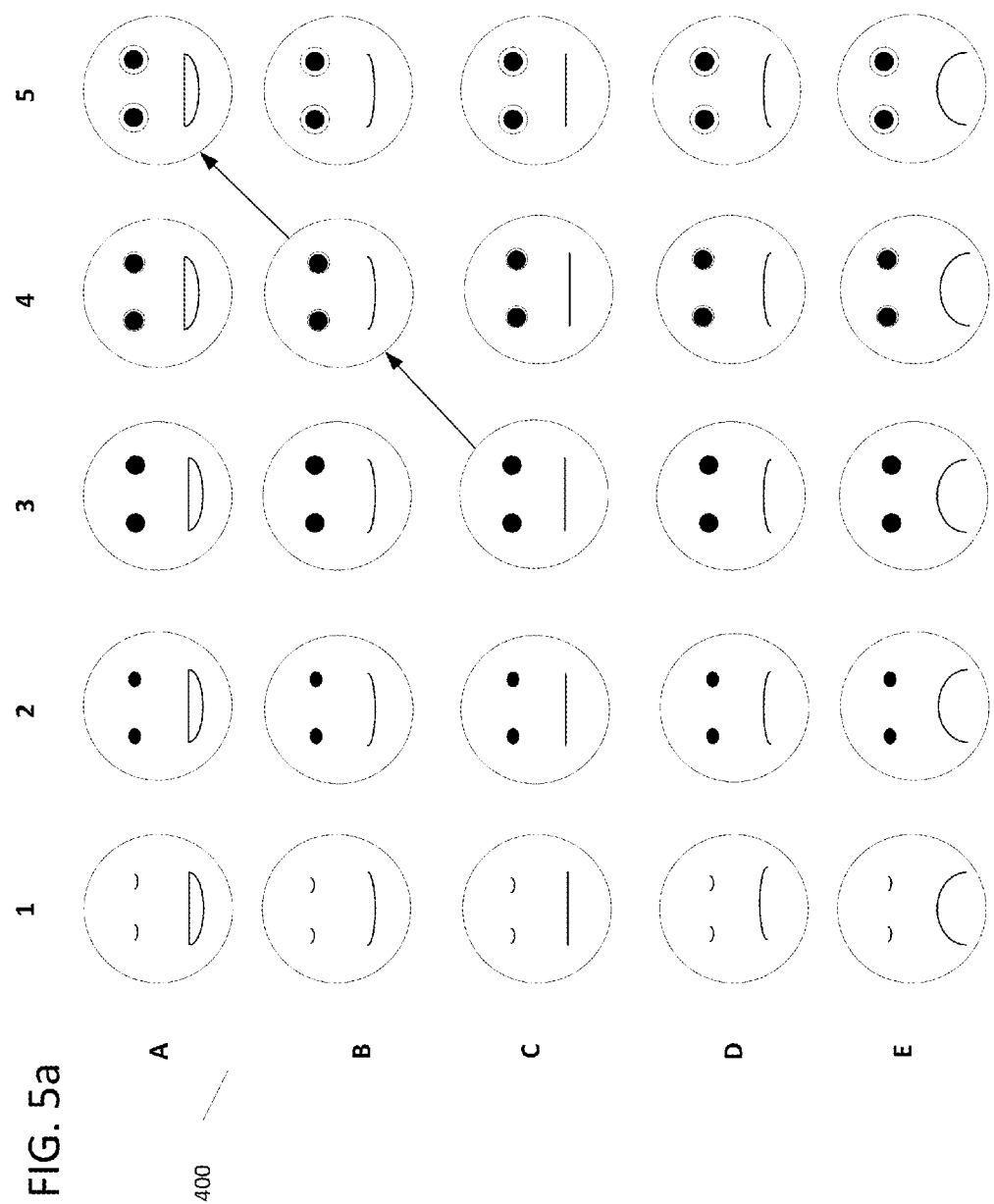

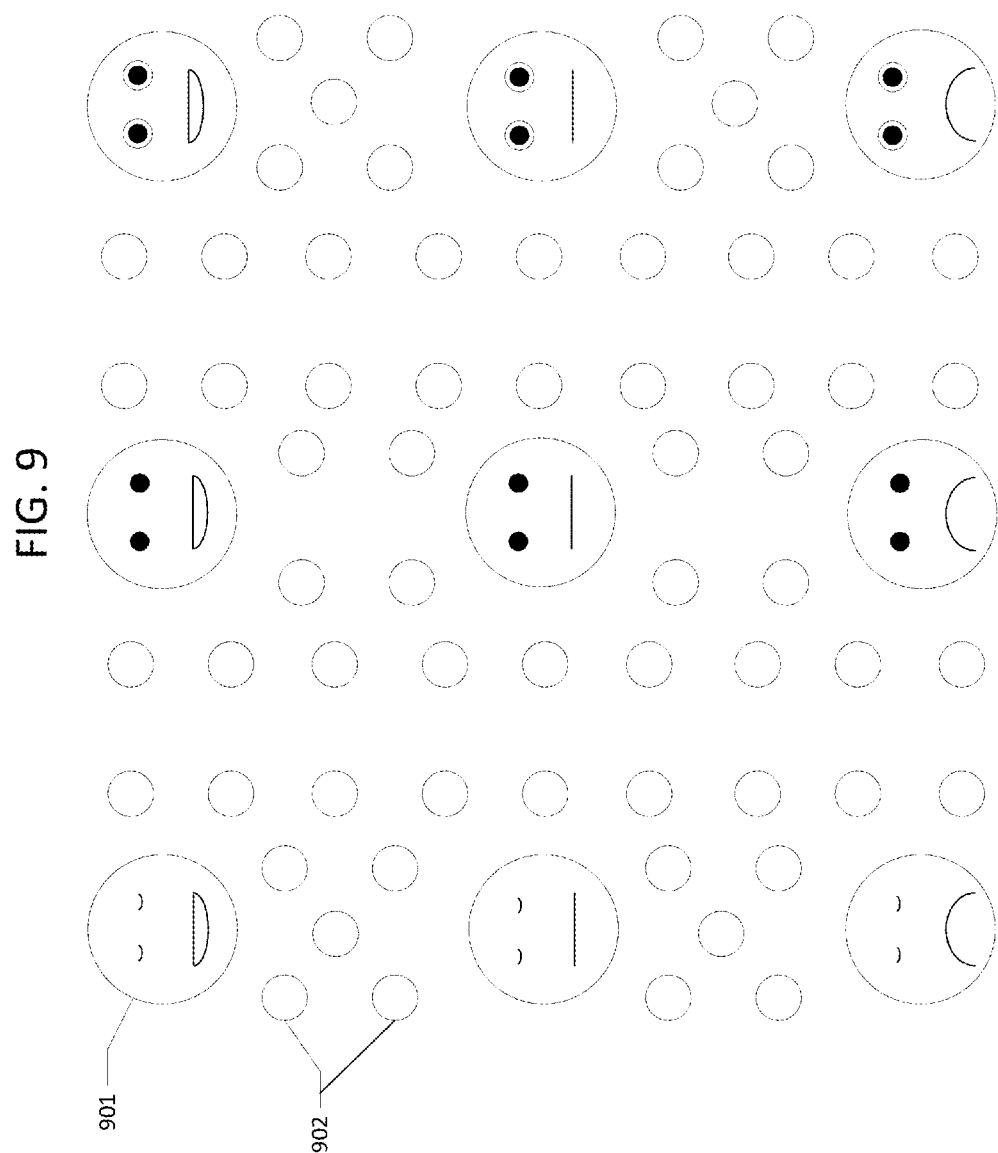

ANIMATION

BACKGROUND

User interfaces on computing devices often use animation to present a better experience. Menu navigation (e.g., smooth rolling of application icons on a touch display) may be animated to present a natural user experience; animated onscreen objects may be used to provide users with feedback (e.g., an animation of a selected object to indicate that it has been selected); and wait animations may be used to let users know that the system is currently processing something. Animations require computing power, and many of them require resource-intensive animation software programs to decompress and decode files containing animations. Some computing devices and/or software applications may not be able to easily extend the processing resources needed to render animations, and there remains an ever-present need for more "lightweight" (e.g., less resource intensive) approaches to offering and presenting animations.

SUMMARY

The following summary is for illustrative purposes only, and is not intended to limit or constrain the detailed description.

In one aspect, an animation method may entail storing an animation image matrix. The animation image matrix may identify adjacent images based on similarity between the adjacent images and a starting image and a first ending image from the animation image matrix. It may also define one of more an image paths through the matrix, and using one of the image paths to display an animation proceeding or sequence from the starting image towards the first ending image.

In some embodiments, defining the image path further comprises limiting the path to sequential selections of images that are adjacent to one another in the matrix.

In some embodiments, the animation image matrix, or image grouping, may be generated by receiving a video file that may be encoded; decoding the file to retrieve a plurality of still images from the file; perform image comparisons between the still images in the file to identify pairs of images whose similarity with one another exceeds a predetermined similarity threshold (which may be a percentage of pixels that are the same); and identifying pairs of images as adjacent if their similarity with one another exceeds the predetermined similarity threshold. The system may store an animation path file identifying a listing of images in a sequence based on a connected path through the animation image matrix between the starting image and the ending image; and display the animation image matrix to a user, and receiving user selections of a start point and end point from the displayed images in the animation image matrix.

Some embodiments may include, one or more of the following steps: displaying the animation image matrix to a user and receiving user selections of a start point and end point from the displayed images in the animation image matrix; receiving a user input indicating a desired animation time duration criterion for an animation between the starting image and the ending image; determining a display time of an animation comprising a sequential display of images in a path through the matrix from the starting image to the ending image; and determining to skip images or duplicate images to adjust an animation time based on the animation time duration criterion.

In some embodiments, the animation may change ending points in mid-animation. Such embodiments may include receiving or determining a selection of a different ending image after displaying the animation proceeding towards the first ending image, and altering the image path to proceed from a displayed image to the new ending image.

Some embodiments may include identifying one or more key images in the matrix, and emphasizing the one or more key images when displaying the animation matrix to a user.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 9 illustrates an example animation image matrix with key images.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
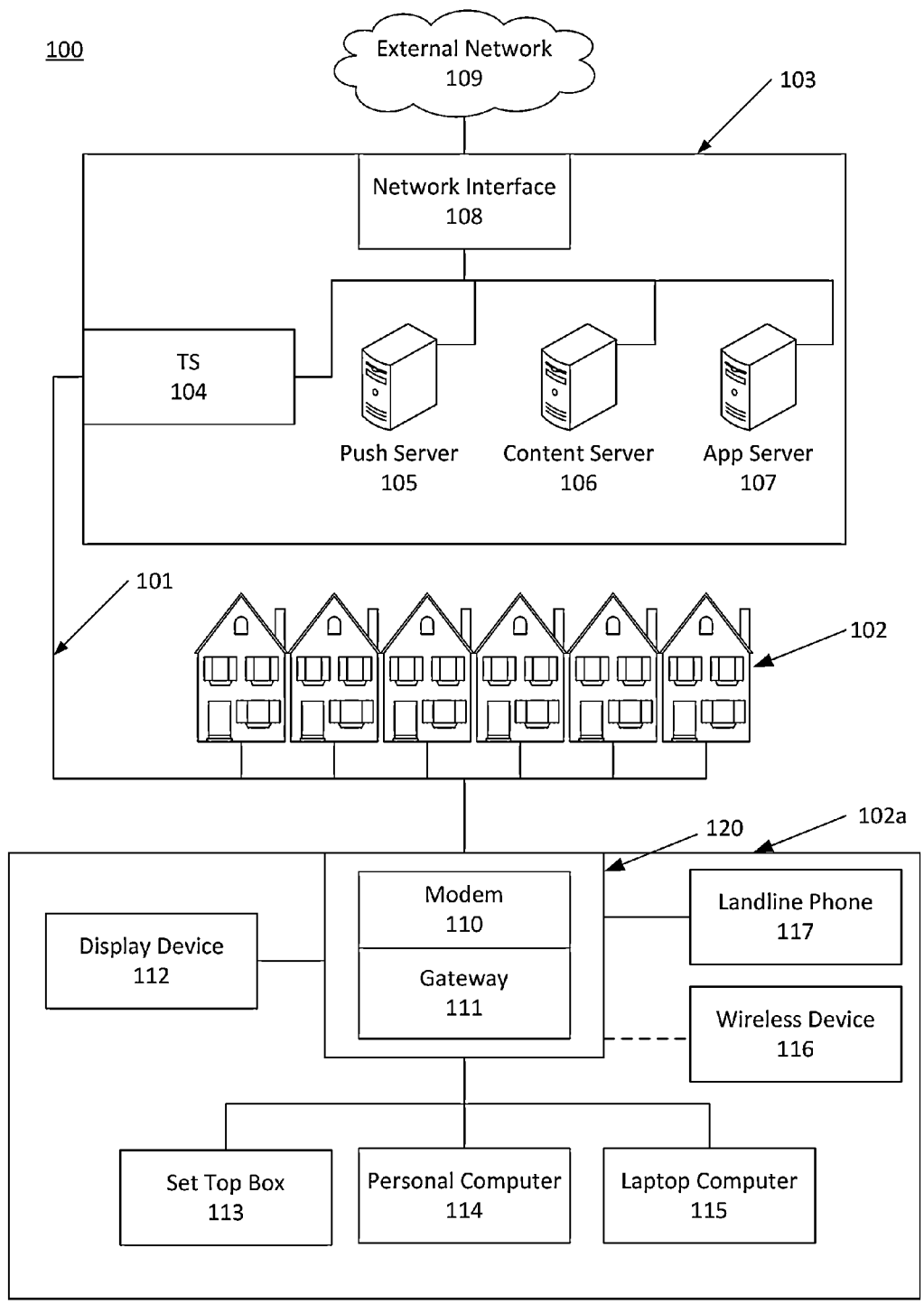
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
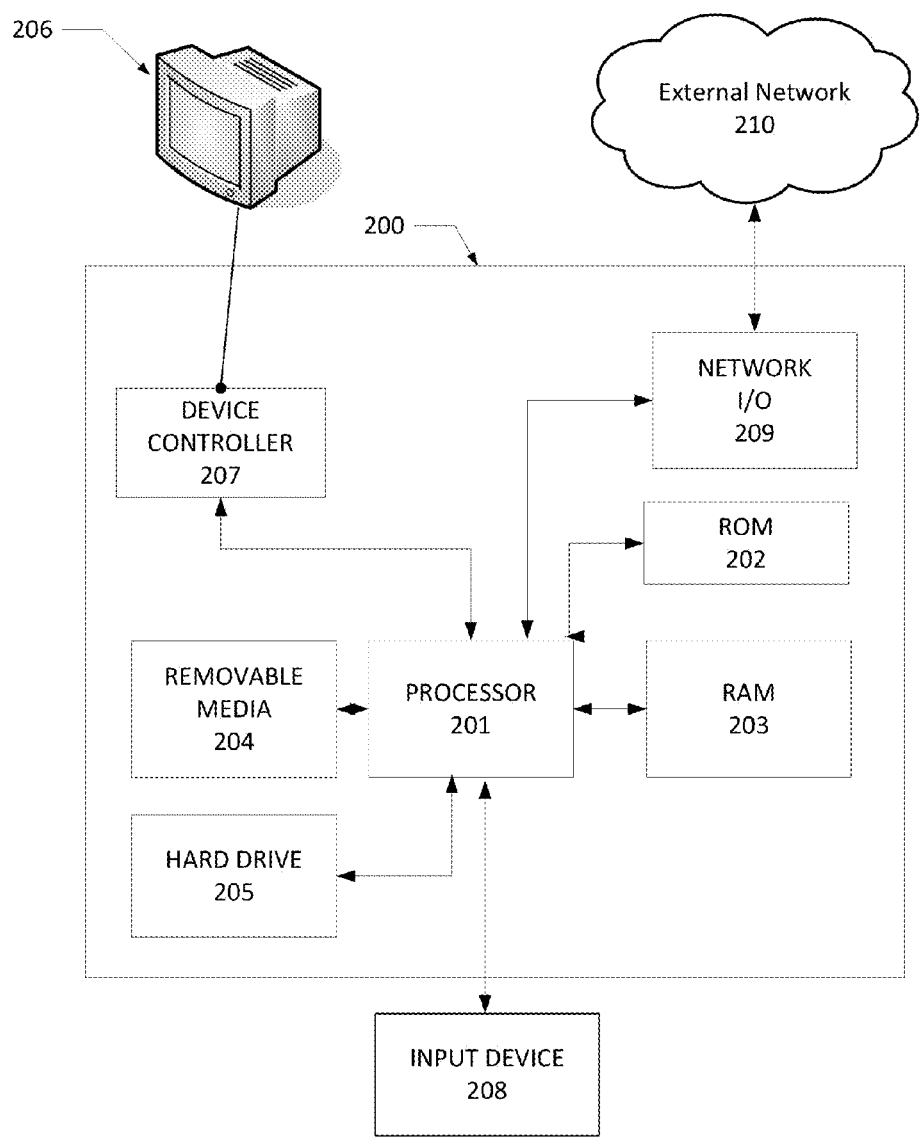
FIG. 2 illustrates an example computing device that can be used to implement any of the methods, servers, entities, and computing devices described herein.

FIG. 2 illustrates general hardware and/or software elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is just an example. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
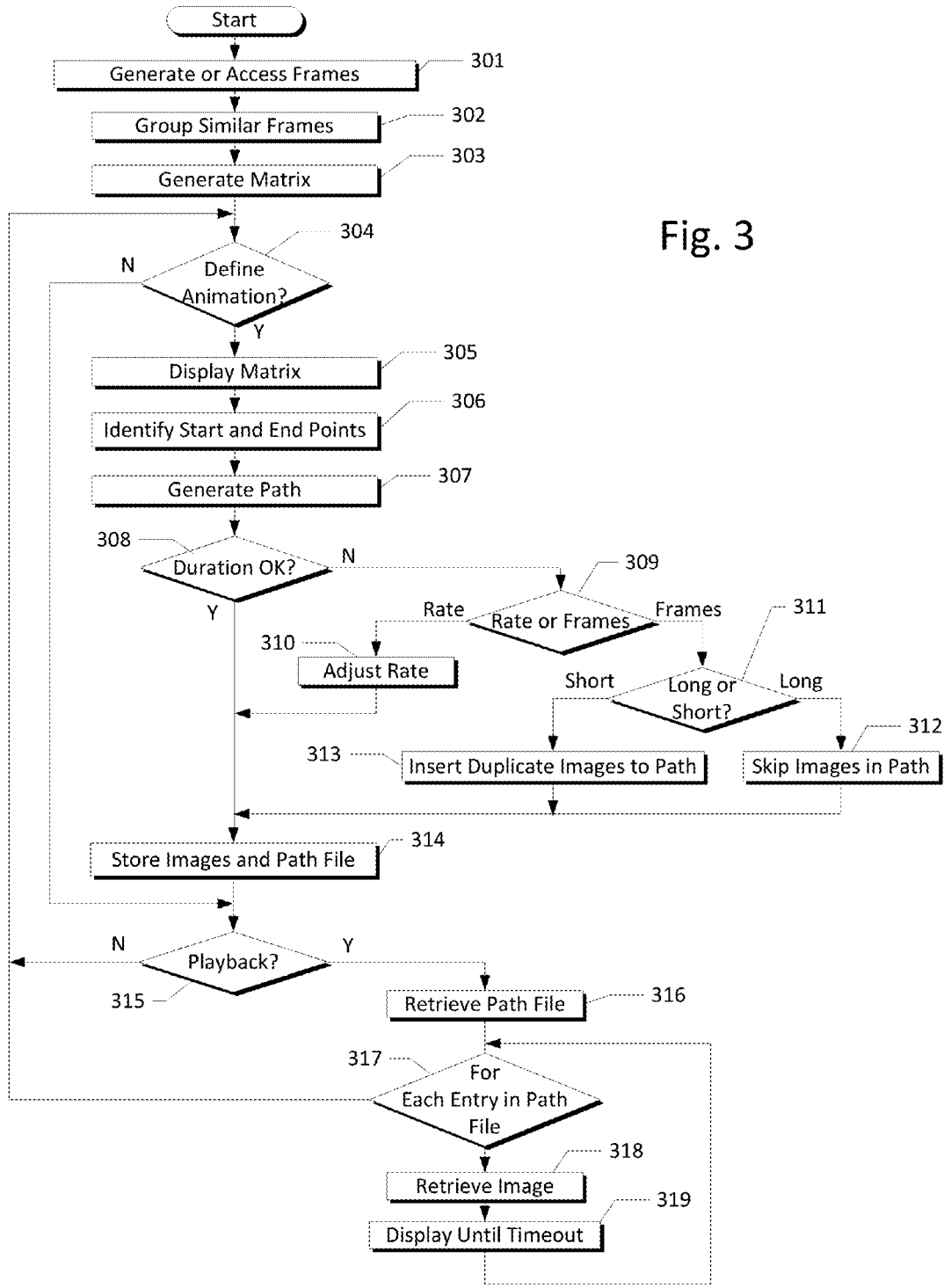
FIG. 3 illustrates an example animation process.

FIG. 3 illustrates an example process for generating animation files of images using an animation image matrix, such as the ones shown in FIGS. 4a&b or any other types of image grouping. These will be described in conjunction below.

Beginning in step 301, a computing device, such as an application server 107, may access or receive a source file for an animation, and process the file to generate or access the images for the animation. The source file may be any type of video file, such as Moving Pictures Experts Group™ (*.mpg), Audio Video Interleave (*.avi), DivX™ (*.divx), Apple Quicktime™ (*.mov), Microsoft Windows Media™ (*.wmv), and Adobe Flash™ (*.flv). In processing the images, the computing device may use the appropriate decoder to retrieve the individual images from the video, and store those images separately in memory as static image files. Each image may be stored as a separate image file, and may be made available for network use. For example, each image may be stored in a directory that is accessible to devices via an Internet address or In step 302, the computing device may analyze the various images to identify images that are similar to one another, within a predetermined degree of similarity. The comparison may be made by any desired image comparison technique, and the degree of similarity may be measured, for example, by a percentage of image pixels that are the same color value between two images, and images may be considered similar if a predetermined minimum percentage of their pixels are the same. For example, if two images have 99% of their pixels of the same color, then they may be considered similar, and a data record may be stored to indicate this similarity. In some embodiments, the similarity may allow for slight differences in color. For example, a color value range may be established, and pixels whose colors are not identical, but within the color value range of one another, may still be considered similar. For example, a hexadecimal range of 10 would allow color values of #FFFFFFFF and #FFFFFFFE to be considered similar to one another. This color value range compensates for slight variations in pixel color from one image to the next. As a result of this analysis, an image matrix may be generated, in which similar frames appear next to one another. The matrix may be an n-dimensional logical data structure, and may have images logically arranged such that similar images are adjacent to one another.

FIG. 4a illustrates a simplistic version of a two-dimensional image animation matrix 400. In the example matrix 400, the various images appear in the two-dimensional matrix labeled with rows A-E and columns 1-5. The images differ from one another based on two variables—the eyes going from open to closed, and the mouth going from a frown to a smile. In the matrix, adjacent images are more similar to one another than they are to images that are farther away in the matrix. All of these images may have been found in the original source video file, and in the step 302 analysis, the computing device may have determined that, for example, the image at A5 was sufficiently similar to images B5 and A4, such that those images are placed adjacent to one another in the matrix. By comparison, image E1 is quite different from image A5 (e.g., less than 99% of its pixels match, represented in this case by having the eyes and mouth both be different), so it is placed (logically, within the matrix) at a different location, not adjacent to A5. Since the example images just varied by 2 variables (eyes and mouth), the matrix 400 is easily shown as a two-dimensional matrix. In practice, however, images may be similar to (or different from) one another for a wide variety of reasons, far more than two, and the actual matrix may be more than two-dimensional. For example, the A5 image may actually be considered similar to a hundred other images, and the data representing the matrix may account for these many different related images.

Figure 4B:
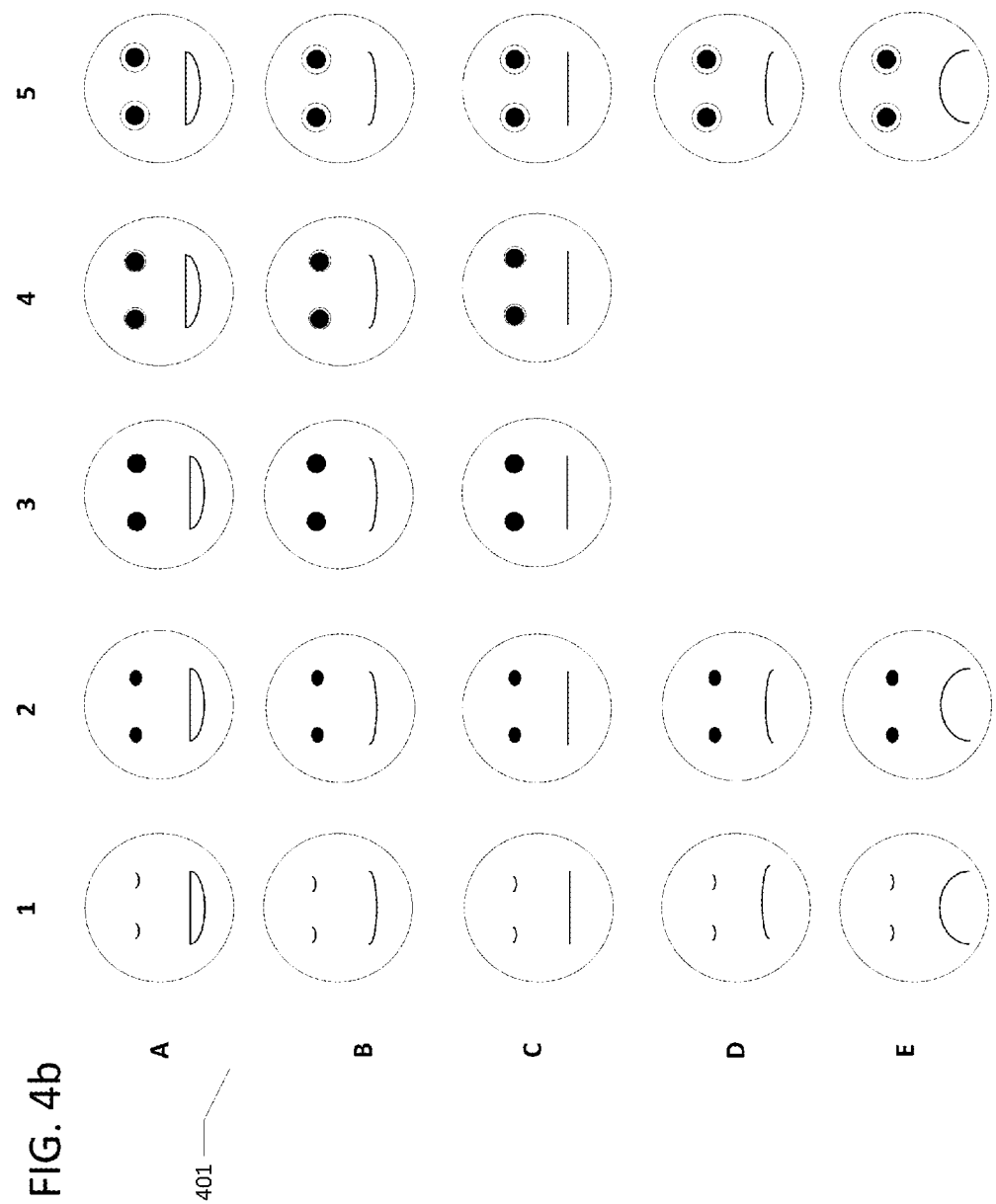
FIGS. 4a&b illustrate example animation image matrices.

The FIG. 4a example showed a full, five-by-five matrix of images, on the assumption that the underlying source video had images that showed all of those faces. In practice, the underlying source video might not have such a full complement of images. FIG. 4b shows another example matrix 401, in which the source video file had fewer images. The source video in that FIG. 4b example simply might not have had any images that included the faces shown at D3, D4, E3 and E4 of FIG. 4a. So, due to the absence of similar images, some images (e.g., E5) might have fewer adjacent images in the matrix than other images (e.g., B2 has 8 adjacent images, while E5 only has one). Such an absence of adjacent images may help guide animations, as will be explained further below.

Figure 5B:
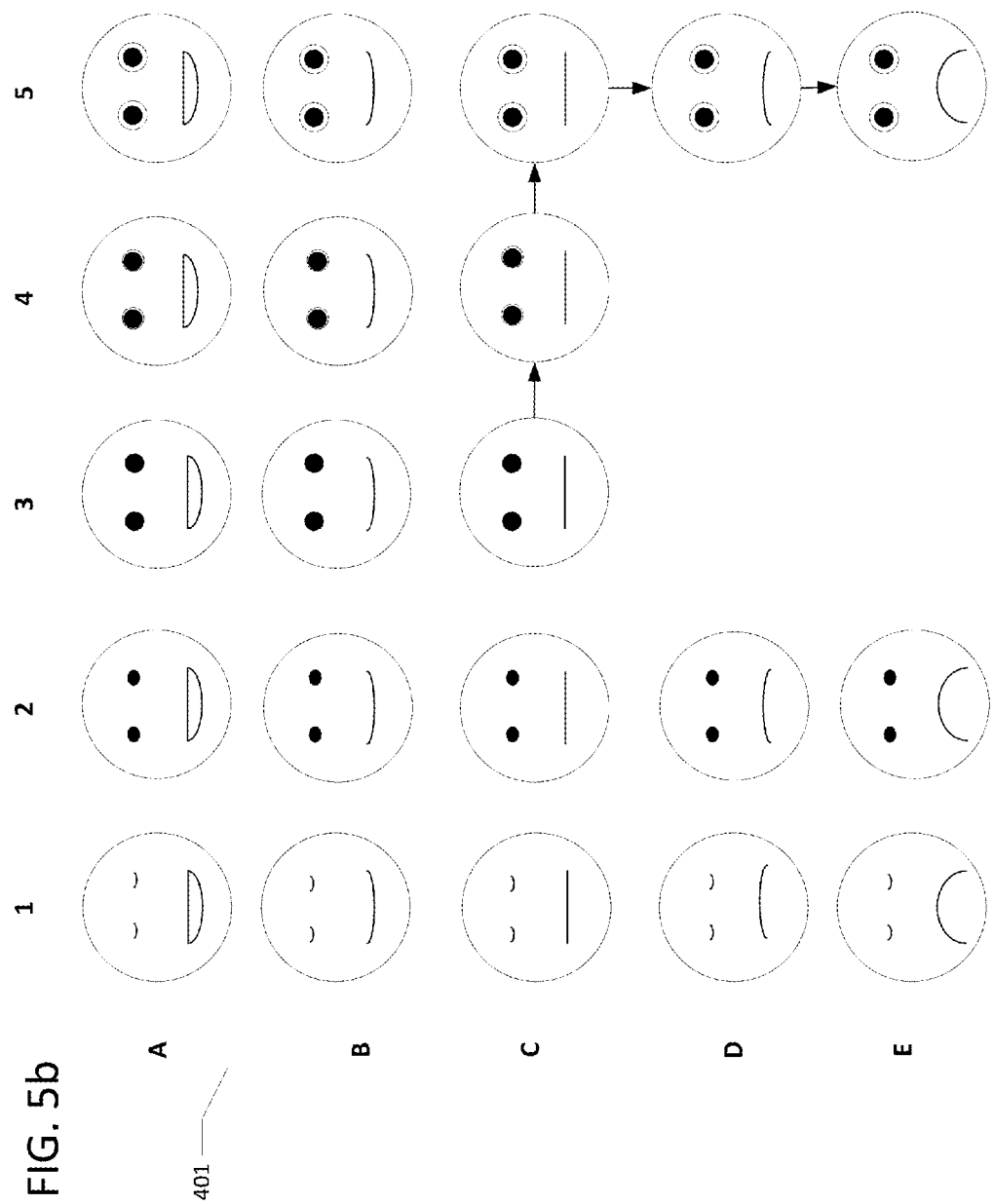
FIGS. 5a&b illustrate example animation paths through animation image matrices.

Using the matrices 400, 401, animations may be described as a path through the matrix. For example, and as shown in FIG. 5a, a path may entail showing the face from image C3, then the face from image B4, and finally the face from image A5. In this sequence, the animation goes from image C3 to A5, following a path indicated by the arrow. FIG. 5b illustrates another path, this time through the matrix 401. In this example, the animation begins at image C3, then moves to C4, to C5, to D5, and finally to E5. Any desired animation between any two points on the matrix can be made by selecting a shortest-length path between the two points, and the fact that similar images are placed adjacent to one another means that moving along this path will result in smooth image transitions suitable for an animation. The blank gaps in the matrix (e.g., at positions D3, D4, E3 and E4 in FIG. 5b) may cause the shortest path between two points to take a detour through existing images, instead of the straightest line.

Returning to the FIG. 3 flow diagram, the computing device may generate the matrix for the source video in step 303. The computing device may also or otherwise generate a group for the source video. This may involve decoding the video file to produce individual images, conducting image analysis between images to determine if they are similar enough to be arranged adjacent to one another in the matrix or group, and storing data (e.g., data arrays) identifying the various images and their logical positions and adjacencies in the matrix. In some embodiments, an adjacency matrix may be generated to identify the relationships between any two images in the animation matrix. The adjacency matrix may be a simple two-dimensional array, with a row for each image and a column for each image, and at the intersection of each row and column, a binary value indicating whether the two images corresponding to the row and column are considered adjacent to one another. Such an adjacency matrix may appear as follows, for the animation matrix 401 (and only representing the Row D and E images, for the sake of brevity), with values indicating whether the corresponding images are deemed adjacent:

| Adjacent? | D1 | D2 | D5 | E1 | E2 | E5 |
|---|---|---|---|---|---|---|
| D1 |  | Yes | No | Yes | No | No |
| D2 | Yes |  | No | No | Yes | No |
| D5 | No | No |  | No | No | Yes |
| E1 | Yes | No | No |  | Yes | No |
| E2 | No | Yes | No | Yes |  | No |
| E5 | No | No | Yes | No | No |  |

The example matrix is binary, with a "yes" or "no" indicating adjacency between any two images. In some embodiments, the matrix may indicate a degree of adjacency that has more than just two binary options. For example, the matrix may indicate, on a scale of 1 to 16, a degree of similarity between any two images, or the adjacency may be represented as a number indicating a number of intermediate images in the path between the two images. The actual path between the two images, however, may be determined using an animation matrix as shown in FIGS. 4a-b and 5a-b, since the animation matrix would illustrate any gaps, as well as the intermediate images between any two images.

In some embodiments, an adjacency list may be generated to assist with identifying nodes that are adjacent. The adjacency list may contain an entry for each image, and each image's entry may identify a listing of one or more images that are adjacent to it. For example, the list may be as follows:

A1:A2, B1, C2, D2, E1 ...

A2:A1, C3, D1, D3, F1 ...

...

Z5:F2, C5, E3, G2 ...

Figure 6:
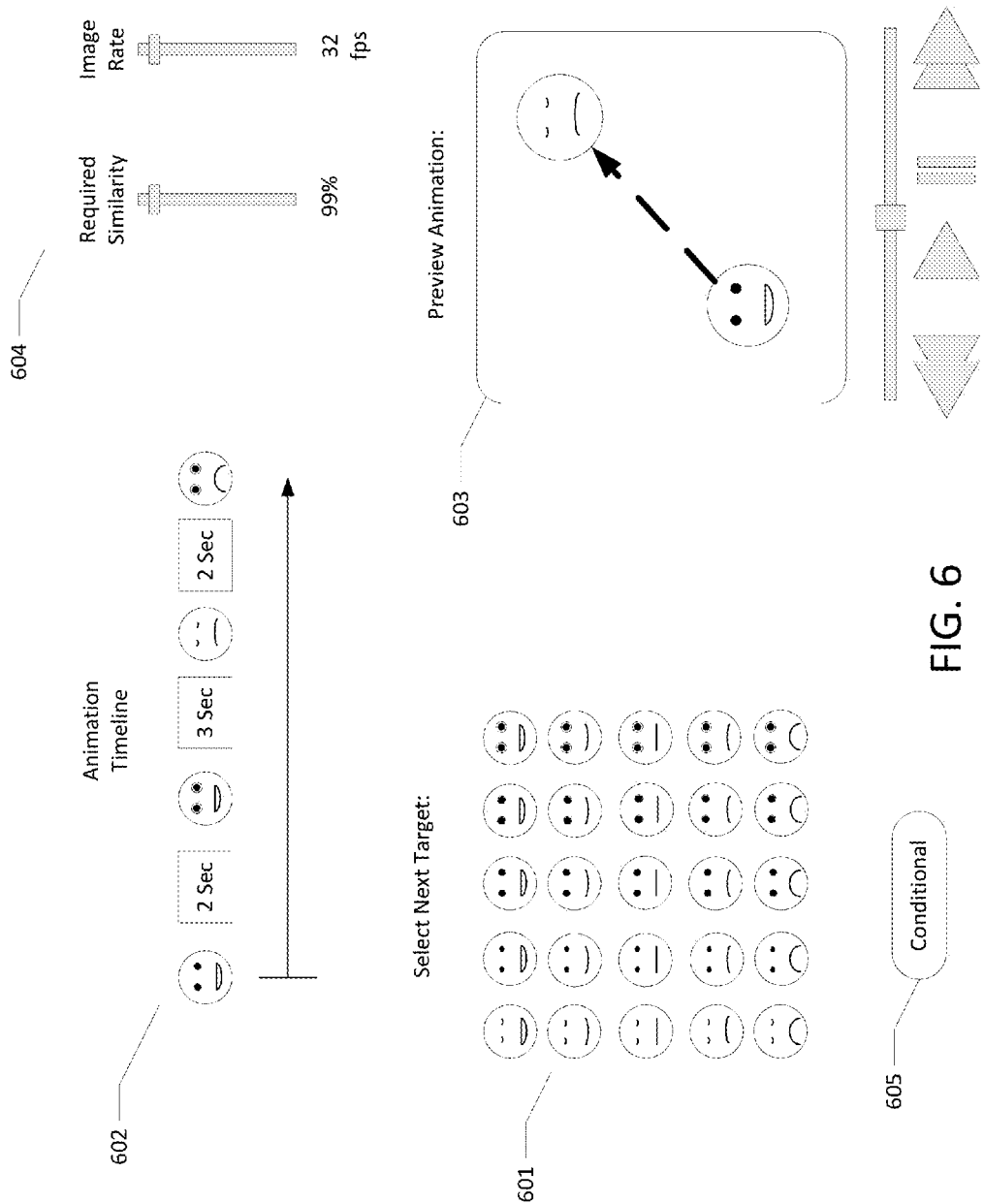
FIG. 6 illustrates an example animation creation user interface.

In step 304, the computing device may determine whether a user has requested to define an animation. This may occur, for example, when a software developer wishes to create a lite animation based on an underlying video source file that was previously processed in steps 301-302. If the user has requested to define an animation, then in step 305, the computing device may display the source video file's corresponding matrix 400 to the user. The display may appear as shown in FIG. 6, with the matrix 601 illustrating thumbnail versions (or full-size versions) of the various images from which the user may choose. In some embodiments, the matrix 601 may depict all frames that exist for a particular application, such as all possible frames that an onscreen character may exhibit. In other embodiments, the matrix 601 may simply show an illustrative sample of the existing frames. In such embodiments, when an animation is needed to traverse between two of the images in the matrix 601, the computing device may still use the adjacency matrix and/or list to generate the actual animation using all of the necessary images—the simplification of the display to show representative images may simplify the animator's process of reviewing and selecting frames for an animation. Other elements of the FIG. 6 example display will be discussed further below.

In step 306, the user may select an image (e.g., by clicking a mouse pointer, or tapping a finger on a touch-sensitive display) to be the starting point for an animation, and select another image to be the ending point. In the FIG. 5b example, the user may have selected image C3 as the starting point, and images E5 as the ending point.

In addition to identifying the start and end points, the user may also indicate a desired animation time duration. For example, the user may be prompted to indicate a maximum, minimum, or range of a number of seconds (e.g., 1.5 seconds, or in the range of 1 to 2 seconds) or images (e.g., 80 images at a 24 image/second display rate) in which the user wishes the animation to complete displaying the images in the path from the starting point to the ending point.

In step 307, the computing device may then determine a shortest path in the matrix between the identified start point image and end point image. The path may pass from image to image in the matrix, and may avoid passing through or skipping over blank gaps in the matrix. Using the FIG. 5b example, the path may begin with image C3, and move to image C4, to C5, to D5 and finally to E5. The images in this path may then become the images of an animation.

In step 308, the computing device may calculate a total number of images in the resulting animation, and determine if the number of images in the path, if displayed as successive images in an animation, will result in an animation that falls within the animation duration entered in step 306. In the FIG. 5b example, the path contains five (5) total images. Based on a default animation rate (e.g., 24 images per second), the computing device can determine whether an animation showing the images in the path (e.g., the 5 images in the FIG. 5b path) would result in an animation that satisfies the user-specified animation duration. The examples here are merely illustrative, so while the numbers above would result in an animation lasting (5/24 seconds), the actual number of images in the path and the actual display rate may be different in different embodiments.

If the resulting animation would not satisfy the duration requirement, then in step 309, the computing device may offer the user a variety of options for resolving the problem. The user may be given the option of either adjusting the display rate of the animation to speed up or slow down the animation so that its duration satisfies the user's duration requirement, or the user may choose to have the computing device automatically identify images along the path to be displayed more than once, or skipped, in the resulting animation to satisfy the duration requirement. These options may be displayed to the user for selection, or they may be initially configured by the user. A third option of disregarding or adjusting the duration requirement may also be provided, to allow the user to simply accept the animation as currently defined.

If the user chooses to have the computing device adjust the display rate of the animation to satisfy the duration requirement, then in step 310, the computing device may determine a new display rate that would satisfy the duration requirement. One way to determine the new display rate would be to use the following calculation:

[New Display Rate]=((Number of Images in Path)/(Required Duration))

If the new display rate is supportable by the display device (e.g., if the new rate does not exceed the maximum display rate of the physical display device used to display the animation), then the computing device can set the new display rate for the animation in step 310. If the new display rate is not supportable by the display device (e.g., the new rate is faster than the display can physically handle), then the process may revert to step 311 to adjust the image count instead of the display rate. For simplicity, FIG. 3 assumes that the new rate is supportable.

If the user elected to adjust the image count instead of adjusting the display rate, then in step 311, the computing device may determine whether the animation exceeded a maximum duration (was too long), or fell below a minimum duration (was too short). If the animation was too long, then in step 312, the computing device may select one or more images in the path to skip in the animation. To select images to skip, the computing device may first determine the playback duration of the animation as identified in the path (e.g., by multiplying the display image rate by the number of images in the path), and determine the amount of time by which that duration exceeds the user's required duration limit ([Excess Time]=[Playback Duration]−[Duration Maximum]). Then, the computing device may determine how many excess images need to be trimmed from the animation to fit within the duration maximum. This may be done, for example, by dividing the excess time by the playback image rate ([Excess Images]=[Excess Time]/[Display Rate]). Then, the computing device can select the number of [Excess Images] from the path for removal, by evenly distributing the removals over the length of the path.

If, in step 311, the animation was too short, then in step 313, the computing device may select one or more images form the path to display more than once during the animation. To do so, the computing device may first determine how much additional time is needed for the animation. This may be done by identifying the [Playback Duration] as discussed above, and determining the difference between that duration and the [Duration Minimum]. This difference may be the amount of [Added Time] needed for the animation, and the computing device can determine the number of [Duplicate Images] as follows: [Duplicate Images]=[Added Time]/[Display Rate]. When the number of [Duplicate Images] is known, the computing device can then select that number of the images from the path for duplication. The actual selection of the images can be done in a variety of ways. The computing device can simply select the first and/or last images of the path to duplicate the requisite number of times, or it can evenly distribute the duplication over the length of the path, selecting periodic images in the path for duplication a single time or more (as needed to consume the amount of [Added Time].

Then, in step 314, the computing device may store a path information file, identifying the various images in the path. This file may simply list the various images that comprise the path, and may include duplicate entries for any duplicated images inserted in step 313, or it may omit entries for any images that were selected for skipping in step 312. Each image may be listed according to its file name, which can be an address (e.g., a Uniform Resource Locator—URL, or a file directory) where the image can be retrieved, or a simple image file name if the images are intended to be stored locally to a display device during use. In conjunction with this, the various image paths may be stored as JSON (JavaScript Object Notation)-encoded strings, CSV (Comma-Separated Values) files, YAML files, SQL tables, NoSQL documents, and any other desired format. In some embodiments, the computing device may store a mapping of image identifiers to paths, and to represent animations as sequences of image identifiers.

In some embodiments, the path information file may also indicate a desired image rate for the presentation of the images. The rate may be, for example, the adjusted rate from step 310. In some embodiments, the path information file can be a program, such as a Javascript, containing instructions for the retrieval of the listed images, with timing information indicating when the images should be retrieved. A device executing the program, such as a computing device having an Internet browser that runs the program, may follow the program's instructions to retrieve and display the listed images in the order and timing sequence indicated in the program. Accordingly, the device may be able to provide an animation to the user without requiring video decoding and decompression capability, allowing the animation to appear on smaller and less-capable devices.

In step 315, the computing device (or another device, such as a user's tablet computer or cell phone operating an Internet browser and accessing an Internet page having the lite animation described above) may determine whether an animation is desired. The animation may be, for example, a simple graphic on an Internet site that the user is viewing. If playback of the animation is needed, then in step 316, the computing device may retrieve the path file for the animation, and in step 317, the computing device may begin a loop (e.g., by executing the path file as a Javascript) for each listed image in the path file.

For each listed image, the computing device may retrieve the image in step 318, and display the image in step 319 until the display rate time expires. Upon expiration of the display rate time, the process may return to step 317 to retrieve the next image in the path file, and continue the loop until the animation is completed.

As mentioned above, FIG. 6 illustrates an example display that can be provided to users for generating animations. The display may include a display of the matrix 601, and the user may select individual images as endpoints for the animation. Although the FIG. 3 discussion above identified a single start point and a single end point, the process can be repeated to allow the user to add new end points to the end of previous animations. So, for example, the user can select a first start point and first end point, and then a new second end point. The same path processing (e.g., steps 306-314) may be repeated, with the first end point as a new start point, and the second end point as the new end point, to add a second animation to the end of the previous animation. In this manner, the user can serially select multiple images in the matrix as waypoints along the ultimate path of the final animation. The path may then proceed from the first start point, to the first end point, to the second end point, and then to the third end point, and so on until the user is finished adding waypoints to the path.

Figure 7A:
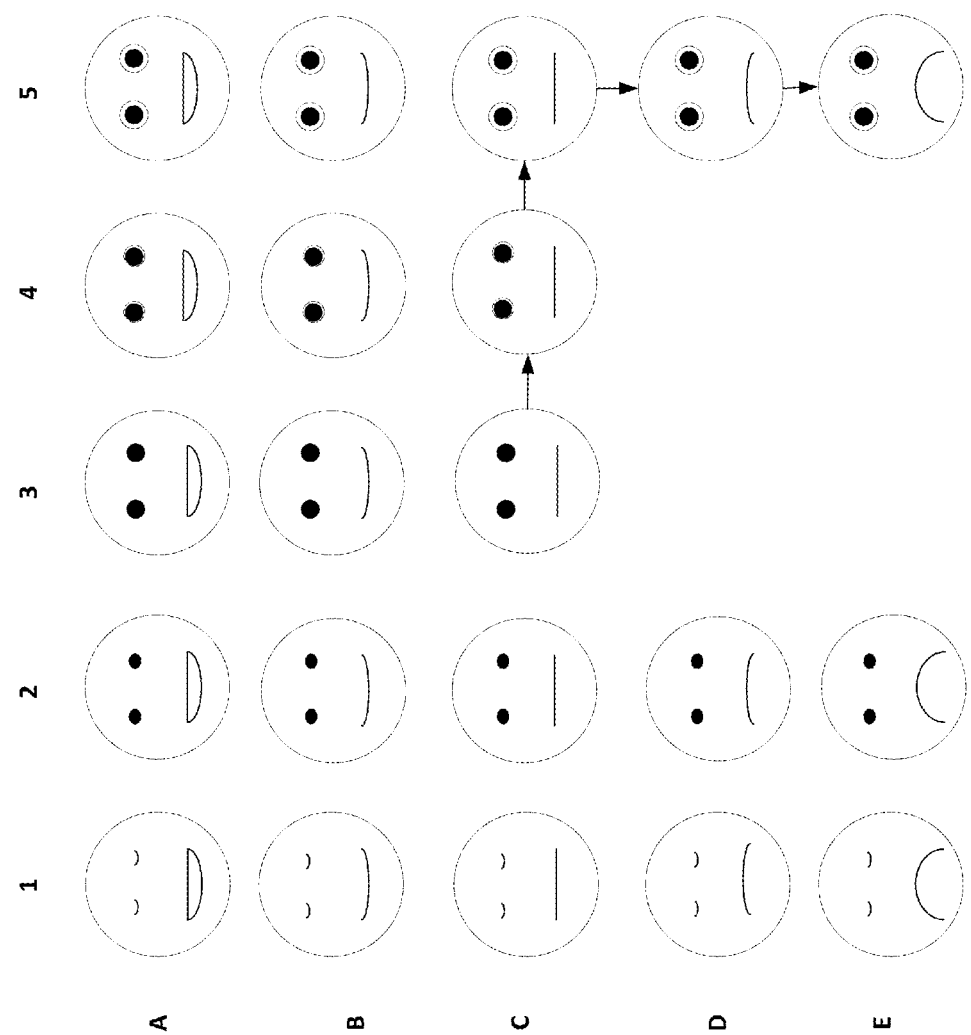
FIGS. 7a-b illustrate example animation paths through animation image matrices.
Figure 7B:
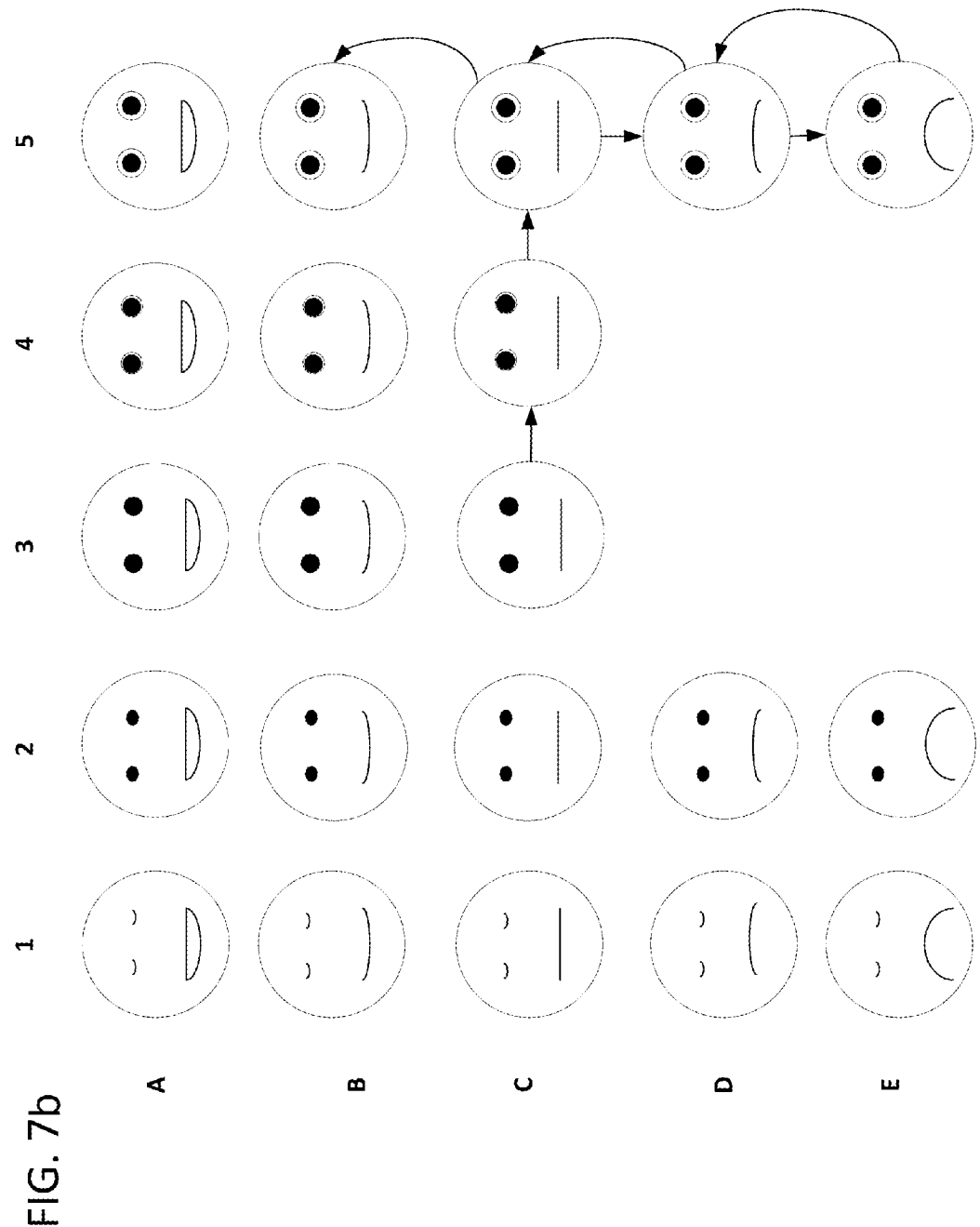

FIGS. 7a-b illustrate example paths having multiple end points. FIG. 7a illustrates an example in which the user selected a start image C3, and an end image E5, and the computing device generated a path between the two images as illustrated. Then, as illustrated in FIG. 7b, the user enters a command to add a new end point after the one at E5. In the example, the user has added image B5 as the new end point, and in response, the computing device may extend the path from E5 to proceed upwards (in the figure) to image B5. The resulting animation, then, would start with image C3, and proceed in the following order: C4, C5, D5, E5, D5, C5 and to end at B5.

In FIG. 6, the display may include a timeline 602, showing the user the various start and end points that the user has selected for a current animation. The display may also allow the user to specify a time duration for each portion of the animation. For example, the user can specify that the animation should take two seconds to go from the start point to the first end point, and then three seconds to go from the first end point to the second end point, and then two seconds to go from the second end point to the last end point. Those respective durations may be used in selecting the images to appear in the animation portions between the end points.

The display may also include a preview 603, which can present the user with the currently-selected animation. The user may be allowed to view, pause, fast-forward, and rewind the animation to determine if the animation looks the way the user wants it to look. If changes are desired, the user can refer to the timeline 602 to adjust the animation by adding and/or removing selected end points, and by adjusting the time durations between the respective end points.

The display may also include options 604 to allow the user to adjust other settings. For example, the user can adjust the amount of similarity required before images will be placed adjacent to one another in the matrix. Lowering the required similarity may result in a matrix having more adjacencies, with animations that may appear rougher and less smooth (since neighboring images are allowed to differ by a larger amount, the change from image to image may be more abrupt in appearance). An advantage to a lowered similarity requirement would be a greater degree of options in possible animation paths (since the matrix will have more adjacencies, there will be more possible paths that the user can define, and a greater overall variety in possible animations).

Figure 8:
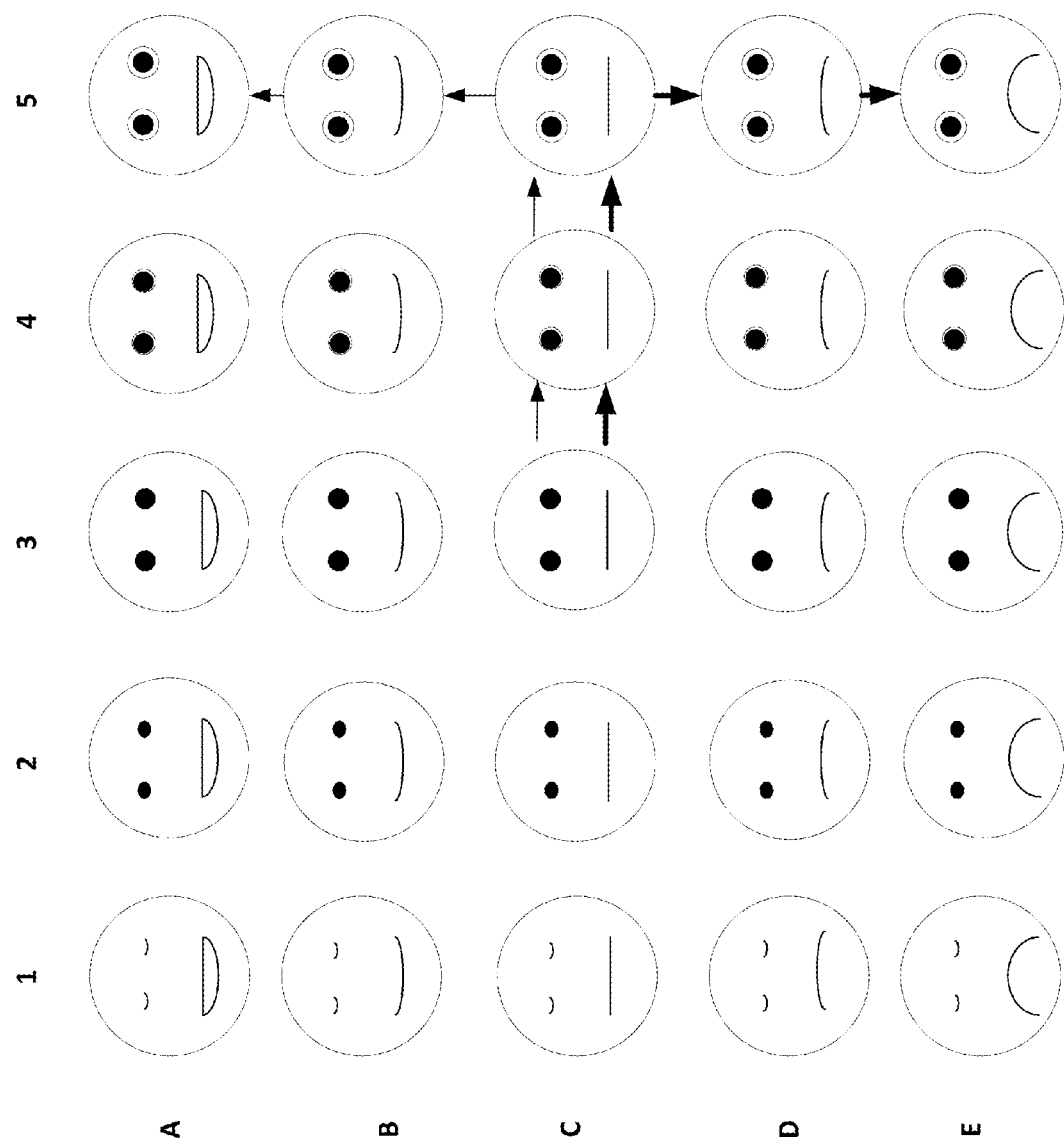
FIG. 8 illustrates an example animation image matrix with a branching path.

As discussed above, the user may define an animation by selecting a series of end points from the matrix, and the computing device can generate an animation path through the matrix connecting the various end points. In some embodiments, the animation path may contain multiple branching paths, with conditional statements defining when the respective branches should be taken. FIG. 8 illustrates an example matrix in which a branching path has been defined. As illustrated, the two possible paths are illustrated with thick and thin lines. Both paths begin at image C3, and move to C4 and C5, but from there, one path proceeds upwards to B5 and A5, while another path proceeds down to D5 and E5. These two diverging paths may be part of a single path information file, with a branching determination performed to determine which path to take following the display of image C5. The branching determination may be based on any desired conditional in the path information file. For example, the conditional may indicate whether a user has responded to a display by pressing a "Like" button. If the user has pressed such a button, then the computing device may determine to follow the upper branch after image C5. If the user has not pressed such a button, then the computing device may determine to follow the lower branch after image C5. The condition may be expressed as part of the path information file, such as a conditional statement in a Javascript. Offering such branching animation paths can allow even greater flexibility in the types of animation that can be presented using the animation path files.

To create the branching path, the user may drag a selected image to an icon on the screen that is reserved for conditionals. Using the FIG. 6 example, the user may select and drag an image to the timeline 602 to place it as the next end point, and can drag it to the conditional button 605 to place it in a branching path. In response to dragging it to the conditional button 605, the computing device may prompt the user to supply the necessary condition, and the user may be presented with predefined condition options for selection. The options can be based on any desired factor, such as user key input, time of day, time elapsed, system power, user identity, etc.

In some embodiments, new end points may be added dynamically while an animation is occurring. For example, if an animation has begun displaying images going from a start point to an end point, a new replacement end point can be identified before the original animation has completed traversing the path, and before the original end point image has been displayed. In mid-animation, a new replacement end point may be identified, either by a new user selection, or automatically based on predetermined criteria or commands. For example, a Javascript for an Internet site may display a first animation in a continuous loop while the user is viewing the site, but in response to a user selection of a button on the site, the animation may change. Using the animation approach herein, a first path through the matrix may contain the various images for the looping animation, and in response to a user selection of the button, the current end point in the animation may be replaced by a new end point. In this situation, the process would resemble the process of adding a new end point discussed above. The currently-displayed image may be treated as a new start point, and the new end point treated as the end point, and the steps 306-314 may be carried out again to generate a new path going from the current image to the new end point.

The example image matrix 400 described above depicts each image from the underlying source video file in a common size. In some embodiments, certain images in the matrix may be identified as key images, representative of the images that surround it, and that key image may be given different treatment. The key image may, for example, be displayed in a larger size when displaying the matrix to the user, and the computing device may suggest the key images to the user for ease of selection. FIG. 9 illustrates an example alternative matrix having more images, and including representative images at various locations around the matrix. In the FIG. 9 example, key images 901 may represent animation images that are more likely to be needed, and may be more prominently displayed in the matrix. For example, the key images 901 may correspond to emotional states of an animated face (e.g., sad and shocked, happy and shocked, neutral, etc.), while the non-key images 902 may correspond to facial expressions that are intermediary images such as partially smiling, somewhat shocked, etc., and which might not be likely to be used as end points for an animation. The actual identification of a key image may be made by the user, who may view an initial matrix as shown in FIG. 5a, and then select individual images and indicate that the selected images are to be treated as key images.

In some embodiments, the key images may be representative of an emotional state as noted above, but nearby images may also similarly represent the emotional state, but with slight differences in appearance. When the user selects a key image, the system may automatically enlarge the neighboring images to allow the user to fine-tune the selection of, for example, a face expressing the happy emotion.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   determining, by a computing device, a two-dimensional image matrix, the two-dimensional image matrix comprising adjacent images based on a similarity between images;
   determining, by the computing device, a starting image and a first ending image within the two-dimensional image matrix;
   defining, by the computing device, an image path within the two-dimensional image matrix, from the starting image to the first ending image, wherein the image path comprises at least one intermediate image; and
   using, by the computing device, the image path to generate an animation sequence from the starting image towards the first ending image, wherein the animation sequence comprises the at least one intermediate image.

2. The method of claim 1, wherein defining the image path further comprises limiting the image path to sequential selections of images that are adjacent to one another in the two-dimensional image matrix.

3. The method of claim 1, wherein generating the two-dimensional image matrix comprises:
   receiving a video encoded file;
   decoding the video encoded file to retrieve a plurality of still images from the video encoded file;
   performing image comparisons between the plurality of still images in the video encoded file to identify pairs of images whose similarity with one another exceeds a predetermined similarity threshold; and
   identifying pairs of images as adjacent if their similarity with one another exceeds the predetermined similarity threshold.

4. The method of claim 3, wherein the predetermined similarity threshold is a percentage of pixels that are the same.

5. The method of claim 1, wherein the image path identifies a listing of a plurality of images in a sequence based on a connected path through the two-dimensional image matrix between the starting image and the first ending image.

6. The method of claim 1, further comprising displaying the two-dimensional image matrix to a user, and receiving user selections of a start point and end point from the displayed two-dimensional image matrix.

7. The method of claim 1, further comprising receiving a user input indicating a desired animation time duration criterion for an animation between the starting image and the first ending image.

8. The method of claim 7, further comprising determining a display time of the animation comprising a sequential display of images in the image path through the two-dimensional image matrix from the starting image to the first ending image.

9. The method of claim 8, further comprising determining to skip images or duplicate images to adjust an animation time based on the desired animation time duration criterion.

10. The method of claim 1, further comprising receiving a selection of a new ending image after displaying the animation sequence, and altering the image path to proceed from a displayed image to the new ending image.

11. The method of claim 1, further comprising determining one or more key images in the two-dimensional image matrix, and emphasizing the one or more key images when displaying the two-dimensional image matrix to a user.

12. A method, comprising:
   retrieving, by a computing device, a two-dimensional image matrix comprising a plurality of adjacent images wherein adjacent images in the two-dimensional image matrix are closer in similarity than non-adjacent images in the two-dimensional image matrix;
   receiving, by the computing device, a selection of a starting image and a first ending image in the two dimensional image matrix;
   selecting, by the computing device, an intermediate image in the two-dimensional image matrix based on an adjacency between the intermediate image and one of the starting image and the first ending image;
   defining by the computing device and within the two-dimensional image matrix, an image path from the starting image to the first ending image, the image path comprising at least the intermediate image; and
   using, by the computing device, the image path to generate an animation sequence from the starting image towards the first ending image, the animation sequence comprising at least the intermediate image.

13. The method of claim 12, wherein defining the image path further comprises limiting the image path to sequential selections of images that are adjacent to one another in the two-dimensional image matrix.

14. The method of claim 12, further comprising:
   receiving a video encoded file;
   decoding the video encoded file to retrieve a plurality of still images from the video encoded file;
   performing image comparisons between the still images in the video encoded file to identify pairs of images whose similarity with one another exceeds a predetermined similarity threshold; and
   identifying pairs of images as adjacent if their similarity with one another exceeds the predetermined similarity threshold.

15. The method of claim 12, further comprising:
   storing an animation path file indicating a listing of images in a sequence based on the image path through the two-dimensional image matrix between the starting image and the first ending image.

16. The method of claim 12, further comprising:
   receiving a user input indicating an animation time duration criterion for an animation between the starting image and the first ending image.

17. The method of claim 16, further comprising:
   determining to skip images or duplicate images to adjust an animation time based on the animation time duration criterion.

18. The method of claim 12, further comprising:

receiving a selection of a new ending image after displaying the animation sequence, and altering the image path to proceed from a displayed image to the new ending image.

19. A computing device, comprising:

a processor; and a computer-readable medium, storing instructions that, when executed by the processor, cause the computing device to perform the following:

generate a two-dimensional image group indicating adjacent images based on similarity between images;

receive a user selection of a starting image and a first ending image in the two-dimensional image group;

define, in the two-dimensional image group, an image path from the starting image to the first ending image, the image path comprising at least one intermediate image; and use the image path to generate an animation sequence from the starting image towards the first ending image, wherein the animation sequence comprises the at least one intermediate image.

20. The computing device of claim 19, wherein the computer-readable medium further stores instructions that, when executed by the processor, further cause the computing device to:

receive a video encoded file;

decode the video encoded file to retrieve a plurality of still images from the video encoded file;

perform image comparisons between the still images in the video encoded file to identify pairs of images whose similarity with one another exceeds a predetermined similarity threshold; and identify pairs of images as adjacent if their similarity with one another exceeds the predetermined similarity threshold.

\* \* \* \* \*